(12) United States Patent
Meseth

(10) Patent No.: US 7,606,344 B2
(45) Date of Patent: Oct. 20, 2009

(54) CONTAINMENT OF A NUCLEAR POWER PLANT

(75) Inventor: Johann Meseth, Dieburg (DE)

(73) Assignee: Areva NP GmbH, Erlangen (DE)

( * ) Notice: Subject to any disclaimer, the term of this patent is extended or adjusted under 35 U.S.C. 154(b) by 40 days.

(21) Appl. No.: 10/727,753

(22) Filed: Dec. 4, 2003

(65) Prior Publication Data

US 2005/0135543 A1 Jun. 23, 2005

(30) Foreign Application Priority Data

Dec. 12, 2002 (DE) ................................ 102 58 354

(51) Int. Cl.
*G21C 9/00* (2006.01)
(52) U.S. Cl. ........................ 376/283; 376/403; 376/299; 376/295; 376/293
(58) Field of Classification Search ................. 376/283, 376/403, 299, 293, 295; 261/77, 19, 121.1
See application file for complete search history.

(56) References Cited

U.S. PATENT DOCUMENTS

| | | | | |
|---|---|---|---|---|
| 4,036,291 A | * | 7/1977 | Kobayashi et al. | 165/104.21 |
| 4,304,198 A | * | 12/1981 | Stiefel | 122/504 |
| 4,305,869 A | | 12/1981 | Lee et al. | 260/45.95 |
| 4,399,082 A | * | 8/1983 | Becker et al. | 261/124 |
| 4,801,424 A | * | 1/1989 | Schweiger | 376/283 |
| 4,948,554 A | * | 8/1990 | Gou et al. | 376/283 |
| 4,986,956 A | * | 1/1991 | Garabedian | 376/283 |
| 5,021,212 A | * | 6/1991 | Kataoka et al. | 376/283 |
| 5,062,458 A | * | 11/1991 | Rohleder et al. | 141/70 |
| 5,122,333 A | * | 6/1992 | Larsen et al. | 376/309 |
| 5,198,184 A | * | 3/1993 | Hiramoto | 376/283 |
| 5,211,906 A | * | 5/1993 | Hatamiya et al. | 376/293 |

(Continued)

FOREIGN PATENT DOCUMENTS

DE 2 303 261 7/1974

(Continued)

OTHER PUBLICATIONS

Nayyar, pp. B.374, C.494 and C.495, Piping Handbook Seventh Edition, McGraw-Hill, Copyright 2000, 1992, 1967.*

(Continued)

*Primary Examiner*—James P Trammell
*Assistant Examiner*—Daniel L Greene, Jr.
(74) *Attorney, Agent, or Firm*—Laurence A. Greenberg; Werner H. Stemer; Ralph E. Locher

(57) ABSTRACT

A containment of a nuclear power plant has a pressure chamber, a condensation chamber, and a substantially vertically running condensation tube. The upper end of the tube is connected to the pressure chamber and the lower end of the tube is immersed in a cooling liquid in the condensation chamber. The lower end of the condensation tube has an elbow and an outlet nozzle. The elbow has an elbow angle which is such that the lower end of the elbow is immersed obliquely in the cooling liquid in the condensation chamber, and the outlet nozzle has an outlet opening which is substantially shielded with respect to the base of the condensation chamber. This renders it possible to significantly reduce the pressure loads on the base and the walls of the condensation chamber in the event of an emergency.

4 Claims, 3 Drawing Sheets

U.S. PATENT DOCUMENTS

| | | | | |
|---|---|---|---|---|
| 5,570,401 A | * | 10/1996 | Gluntz | 376/283 |
| 6,173,027 B1 | * | 1/2001 | Saito et al. | 376/283 |
| 6,195,406 B1 | * | 2/2001 | Conrads et al. | 376/307 |
| 6,896,851 B1 | * | 5/2005 | Onizuka et al. | 422/168 |

FOREIGN PATENT DOCUMENTS

| | | |
|---|---|---|
| DE | 26 18 108 A1 | 11/1977 |
| DE | 198 09 000 C1 | 7/1999 |
| JP | 55-31903 | 3/1980 |
| JP | 2000292578 A | 10/2000 |

OTHER PUBLICATIONS

John et al., pp. 170, 171 and 174 Copyright 1980 and 1971, Prentice-Hall, Inc.*

"SWR 1000—der Siedewasserreaktor der Zukunft" (Brettschuh et al.), Siemens Power Journal Feb. 1996, pp. 18-22.*

Krebs, Figure 4: The containment and internals of the SWR 1000 design, copyright The Uranium Institute 1998, available online @ http://www.world-nuclear.org/sym/1998/fig-htm/kref4-h.htm, last accessed Nov. 17, 2005.*

Sargis et. al., Analysis of steam chugging phenomena. vol. 1: a fundamental thermalhydraulic model to predict steam chugging phenomena, Abstract available @ http://www.osti.gov/energycitations/searchresults.jsp?Author=Sargis,%20D.A., last accessed Nov. 21, 2006.*

Sargis et. al., Analysis of steam chugging phenomena. vol. 2: user's manual for the CHUG1 computer program, Abstract, available @ http://www.osti.gov/energycitations/searchresults.jsp?Author=Sargis,%20D.A., last accessed Nov. 21, 2006.*

Wang et. al., Analysis of steam chugging phenomena. vol. 3: SAMPAC hydrodynamic pool response code, Abstract, available @ http://www.osti.gov/energycitations/searchresults.jsp?Author=Wang,%20S.S., last accessed Nov. 21, 2006.*

Powers, pp. 1-5 and 10, A simplified Model of decontamination by BWR Steam Supression Pools, May 1997, available @ http://www.osti.gov/energycitations/servlets/purl/481867-Aorlx2/webviewable/481867.pdf, last accessed Nov. 21, 2006.*

U.S. Appl. No. 09/655,091, filed Sep. 5, 2000, Meseth.

* cited by examiner

CONTAINMENT OF A NUCLEAR POWER PLANT

BACKGROUND OF THE INVENTION

Field of the Invention

The invention lies in the nuclear technology field and pertains, more specifically, to a containment vessel in a nuclear power installation.

My commonly assigned earlier German patent DE 198 09 000 C1 (corresponding to my copending application Ser. No. 09/655,091) described an innovative structural and safety concept for a boiling water reactor. In the boiling water reactor disclosed in that document, the reactor pressure vessel is disposed centrally in a containment. In addition to the reactor pressure vessel, a closed condensation chamber and a flood basin arranged above it are provided for emergency cooling of the boiling water reactor. The flood basin is open toward a central region, in which the reactor pressure vessel is arranged, and forms a pressure chamber together with the latter. A so-called building condenser is arranged above the flood basin, i.e. in the upper region of the pressure chamber or containment. The building condenser is in communication with a cooling liquid from a cooling basin arranged above the containment and is used to dissipate the heat from the pressure chamber.

The efficiency of the building condenser reacts sensitively to the presence of non-condensable gases, such as nitrogen or hydrogen. The latter may be formed in particular in the event of extreme emergencies. This is because the non-condensable gases reduce the ability of the building condenser to dissipate heat from any steam which may be present in the pressure chamber into the cooling basin. On account of its low relative density, hydrogen accumulates in the upper region of the pressure chamber, so that a high concentration of non-condensable gases may be present in particular in the vicinity of the building condenser, leading to an increase in pressure in the containment.

To dissipate the heat from the pressure chamber in the event of an emergency, i.e. to dissipate non-condensable gases from the pressure chamber, there are known concepts in which the pressure chamber is connected to a condensation chamber via condensation tubes. The steam which is present in the pressure chamber in the event of an emergency, together with the non-condensable gases, passes via these condensation tubes into the condensation chamber. Since the condensation tubes are generally immersed in the cooling liquid in the condensation chamber to a depth of several meters, the steam condenses and only the entrained fractions of the non-condensable gases remain in the condensation chamber.

A system of that type is known, for example, from my earlier German patent DE 198 09 000 C1. The containment described in that document has a condensation chamber, a pressure chamber and a building condenser arranged in the upper region of the pressure chamber, with a diverter tube also being provided, flow-connecting the upper region of the pressure chamber to the condensation chamber in order to divert the non-condensable gases out of the upper region of the pressure chamber into the condensation chamber in a targeted and direct manner.

Conventional condensation tubes substantially comprise a vertically running tube, the upper end of which is connected to the pressure chamber and the lower end of which is immersed in a cooling liquid in the condensation chamber. The condensation tubes generally have a diameter of approximately 400 to 600 mm and at their lower end are cut off substantially perpendicular to the tube axis. With this conventional design, in particular in the event of large leak cross sections, high loads are imposed on the base and the side walls of the condensation chamber as a result of water being thrown up during the initial overflow of air or nitrogen and as a result of the phenomenon known as chugging toward the end of the overflow phase. During chugging, the pressure amplitudes may amount to several bar, and consequently the pressure loads caused by chugging may be the determining factor in the building structure of the containment.

SUMMARY OF THE INVENTION

It is accordingly an object of the invention to provide a containment of a nuclear power plant which overcomes the above-mentioned disadvantages of the heretofore-known devices and methods of this general type and which is further developed such that the pressure loads on the base and the walls of the condensation chamber in the event of an emergency are reduced to a considerable degree.

With the foregoing and other objects in view there is provided, in accordance with the invention, a containment of a nuclear power plant, comprising:

a containment structure having formed therein a pressure chamber and a condensation chamber with a base;

a substantially vertical condensation tube having an upper end communicating with the pressure chamber and a lower end immersed in a cooling liquid in the condensation chamber;

the lower end of the condensation tube being formed with an elbow and an outlet nozzle;

the elbow having an elbow angle causing a lower end of the elbow to be immersed obliquely in the cooling liquid in the condensation chamber; and the outlet nozzle having an outlet opening substantially shielded with respect to the base of the condensation chamber.

In other words, the lower end of the vertically running condensation tube has an elbow and an outlet nozzle, the elbow having an elbow angle which is such that the lower end of the elbow is immersed obliquely in the cooling liquid in the condensation chamber, and the outlet nozzle having an outlet opening which is substantially shielded with respect to the base of the condensation chamber.

In this context, the invention is based on the consideration that while water is being thrown up during the initial overflow of air or nitrogen, considerably lower pressure loads on the base and walls of the condensation chamber are likely, since the air which emerges, on account of the substantially horizontal flow out of the outlet nozzle which is designed in accordance with the invention, is distributed over a significantly larger area. In the event of chugging, i.e. in the event of only low mass flows of steam flowing out and steam bubbles being formed in the condensation chamber, the dynamic pressure loads on the condensation chamber walls are considerably lower, since the outflow area from the outlet nozzle is predominantly closed off by the cooling liquid, whereas in the standard embodiment the entire cross section of the tube has always been uncovered. Tests carried out by the inventors have confirmed that the pressure loads on the base and walls of the condensation chamber are significantly reduced compared to conventional designs of the condensation tubes.

In accordance with one preferred embodiment of the invention, the outlet nozzle is formed by a tube section, of which the side that faces the base of the condensation chamber is longer than the side that is remote from the base of the condensation chamber, so that the local mixing zone of steam and water, in which the highest pressure transients are formed as a result of the bubble collapsing during chugging, is shielded from the base of the condensation chamber. Moreover, the elbow angle of the elbow of the condensation tube is preferably between approximately 70° and approximately 85°, preferably approximately 82°, so that the lower end of the elbow is immersed in the cooling liquid in the condensation chamber in such a manner that it is inclined obliquely downward.

In accordance with a further configuration of the invention, a significant part of the condensation tube is embedded in the wall of the condensation chamber. The condensation chamber wall can in this way absorb all the forces which occur in the condensation tube and ensure additional protection in the event of possible breaking of a condensation tube. Moreover, this avoids the in some cases highly complex holding structures for the condensation tubes, which are customarily arranged freely in the condensation chamber.

The advantages which are achieved by the invention consist in particular in the fact that a completely new outlet geometry of the condensation tube is provided, leading to significantly more favorable properties with regard to the pressure loads which occur on the base and walls of the condensation chamber. The fact that the condensation tube with the specially designed outlet nozzle is immersed obliquely in the cooling liquid in the condensation chamber gives rise to a substantially horizontal outflow over a significantly larger area, and the outflow area is substantially closed off by the cooling liquid. In this way, in the event of an emergency in the boiling water reactor, significantly lower pressure loads on the walls and the base of the condensation chamber are present both during the initial phase when water is thrown up and during the chugging phase.

Other features which are considered as characteristic for the invention are set forth in the appended claims.

Although the invention is illustrated and described herein as embodied in a containment of a nuclear power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
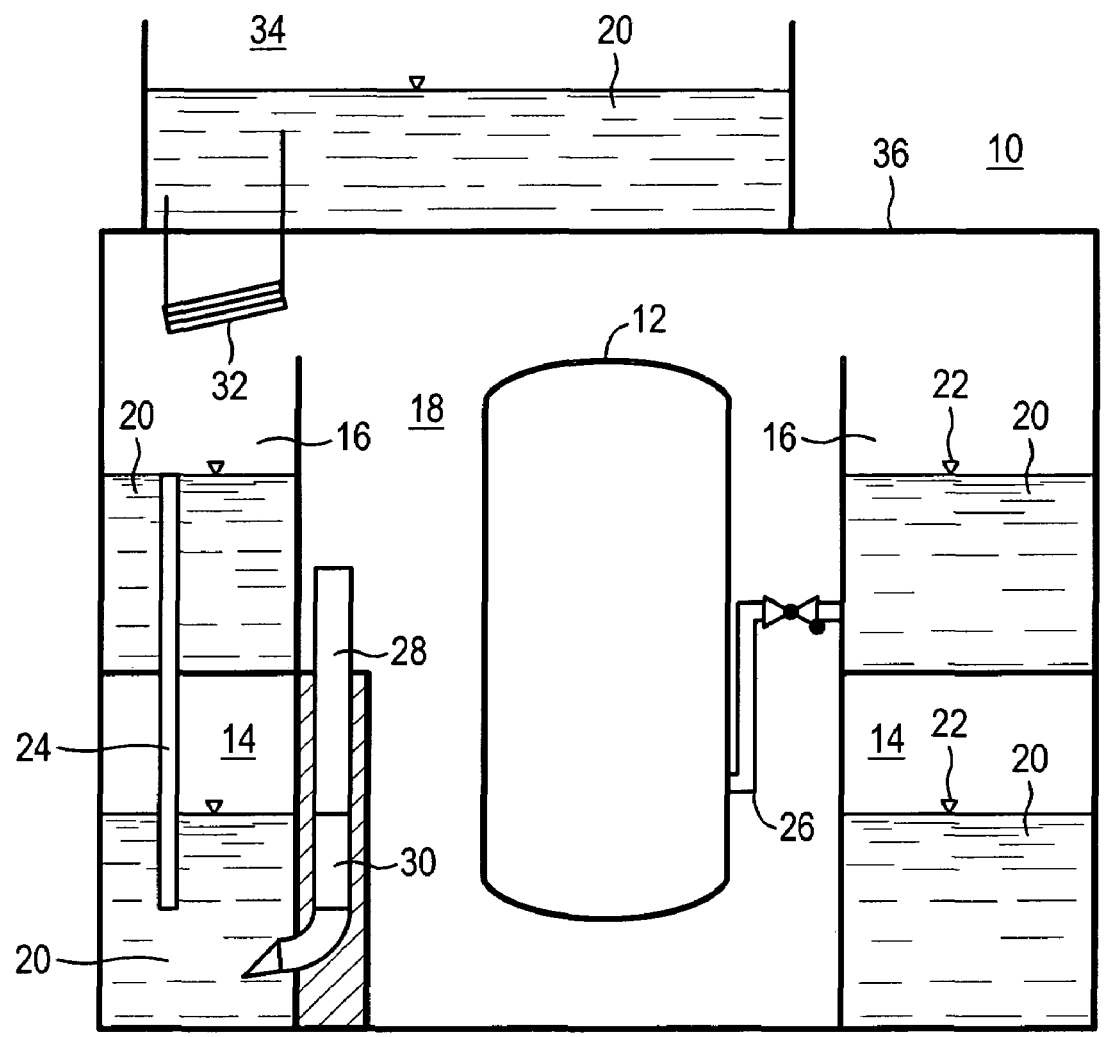
FIG. 1 is a highly simplified, diagrammatic cross section through a containment of a boiling water reactor in accordance with the present invention.
Figure 2:
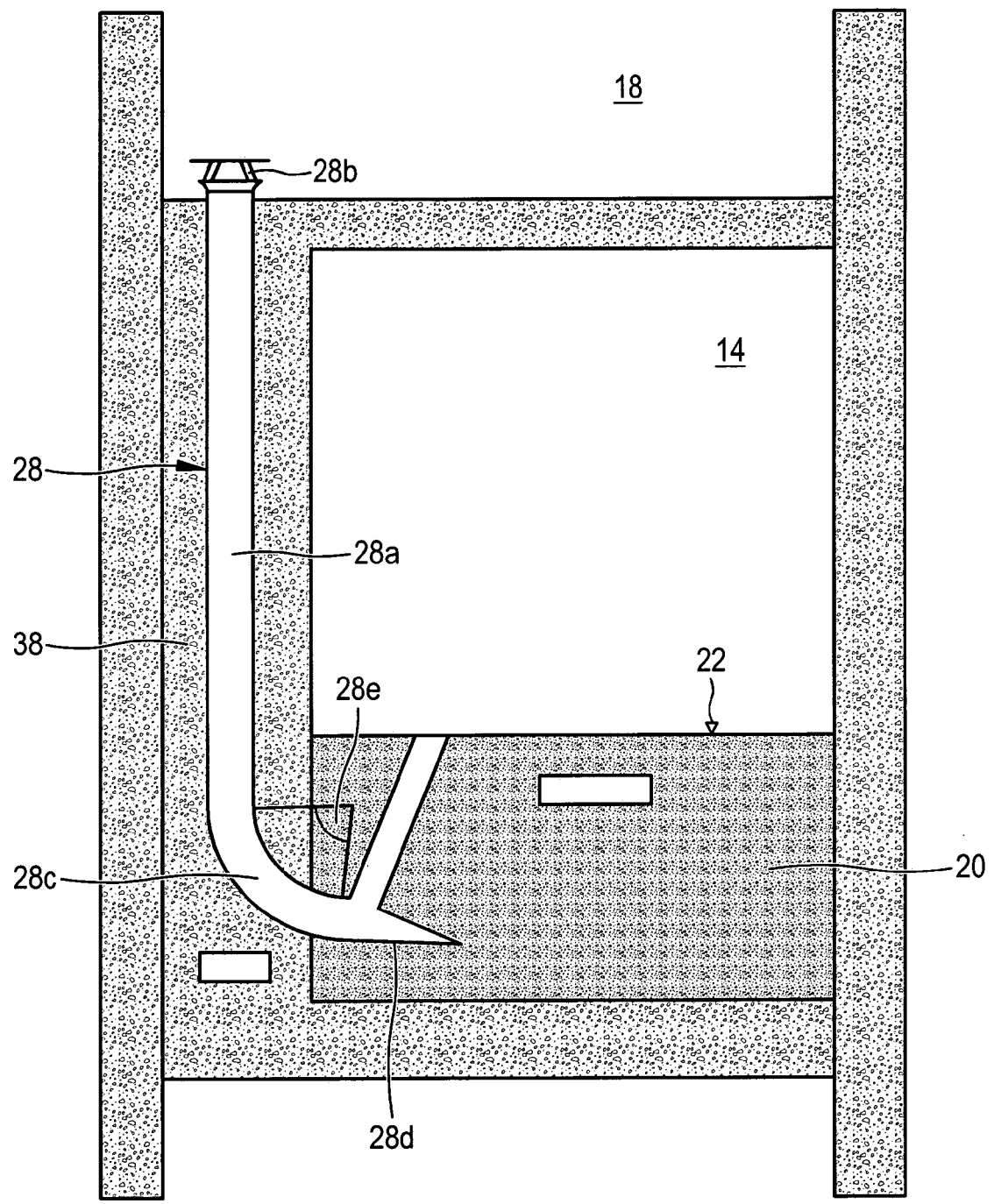
FIG. 2 is an enlarged detail view of the condensation chamber and the condensation tube of the containment shown in FIG. 1 in accordance with the invention.
Figure 3A:
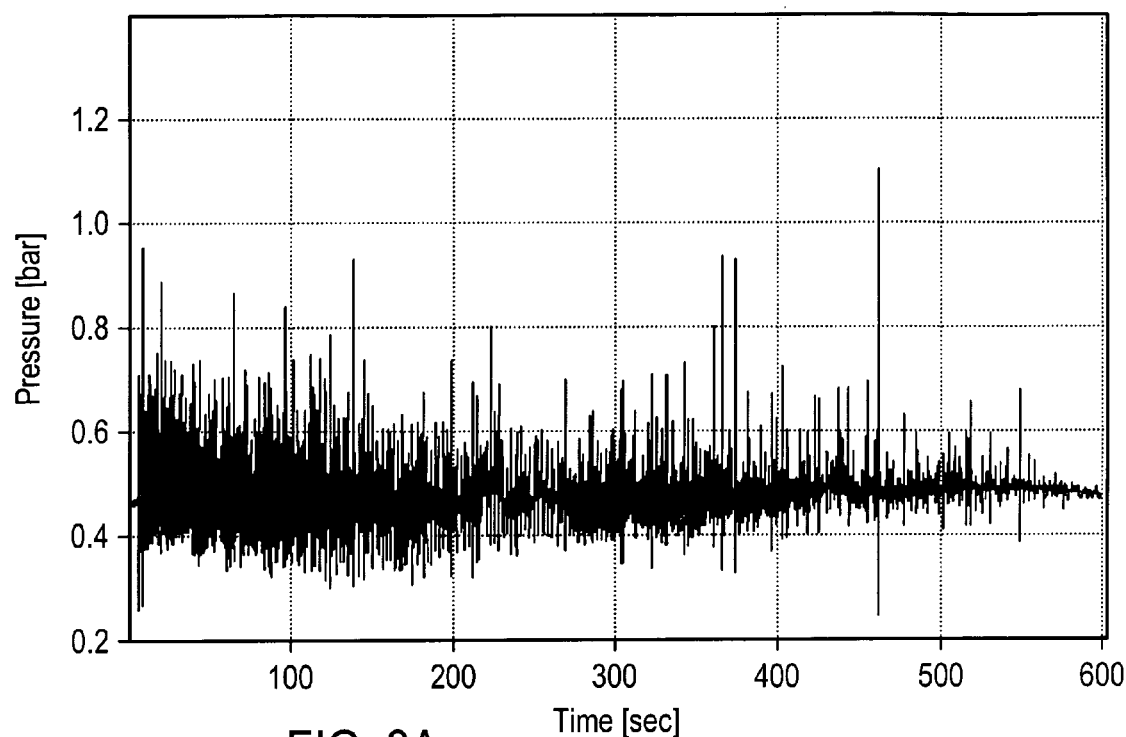
FIG. 3A is a graph illustrating measurement results relating to a pressure load on the base of the condensation chamber in the event of an emergency for a condensation tube in accordance with the invention.
Figure 3B:
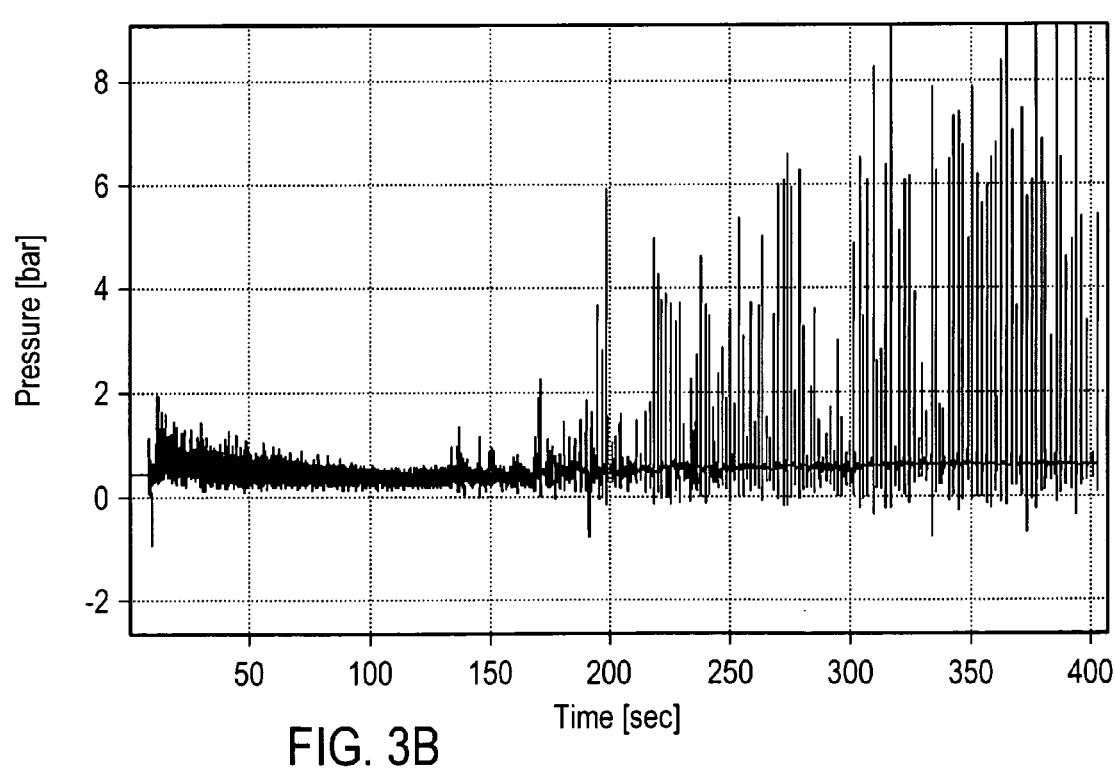
FIG. 3B is a graph illustrating the pressure load on the base of the condensation chamber in the event of an emergency for a conventional condensation tube.

Referring now to the figures of the drawing in detail and first, particularly, to FIGS. 1 and 2 thereof, there is shown the structure of a containment in accordance with a preferred exemplary embodiment of the invention. The pressure load on the base of the condensation chamber when using a condensation tube in accordance with the invention will be compared with the pressure load when using a conventional condensation tube on the basis of FIGS. 3A and 3B.

In accordance with FIG. 1, a reactor pressure vessel 12 is disposed centrally in a closed containment 10. A condensation chamber 14 and a flood basin 16 arranged above it are provided in the containment 10, laterally next to the reactor pressure vessel 12. The flood basin 16 is open at the top toward the interior of the containment 10. The interior is also referred to as the pressure chamber 18, which forms a common pressure space with the flood basin 16.

The condensation chamber 14 and the flood basin 16 are each partly filled with a cooling liquid 20, in particular water, to a filling level 22. The maximum filling level 22 in the flood basin 16 is determined by the upper end of an overflow pipe 24. The overflow pipe 24 connects the flood basin 16 to the condensation chamber 14 and opens out into the cooling liquid 20 of the condensation chamber 14, so that in the event of the maximum filling level 22 being exceeded the cooling liquid 20 flows out of the flood basin 16 into the condensation chamber 14. The flood basin 16 is also connected, via a flood line 26, to the reactor pressure vessel 12. In the event of an emergency, the flood basin 16 can supply the pressure vessel 12 with sufficient cooling liquid 20.

The condensation chamber 14 is substantially closed off from the pressure chamber 18. It is only in communication with the pressure chamber 18 via one or more condensation tubes 28. The condensation tube 28 is immersed in the cooling liquid 20 in the condensation chamber 14, so that there is no exchange of gases between the condensation chamber 14 and the pressure chamber 18. The condensation tube 28 is normally closed off by a water column 30 in the condensation tube 28; only in the event of an emergency, when the pressure rises in the pressure chamber 18, does steam flow into the condensation chamber 14 via the condensation tube 28 in order to be condensed. The precise structure and functioning of the condensation tube 28 are explained in more detail below with reference to FIG. 2. In the left-hand half of FIG. 1, a building condenser 32 is arranged in the upper region of the containment 10 and therefore in the upper region of the pressure chamber 18. The building condenser 32 is designed as a heat exchanger with heat exchanger tubes and is flow-connected to a cooling basin 34, which is arranged outside the containment 10 on top of its cover 36. The building condenser 32 takes up the heat from its surroundings inside the containment 10 and transmits it to the cooling basin 34, with the result that heat can be dissipated from the containment 10 into the external surroundings.

In the event of an emergency, for example in the event of a steam line in the containment 10 breaking, with the associated escape of steam, or in the event of a loss of coolant, the temperature and pressure in the containment 10 rise. Various emergency cooling devices, of which only the building condenser 32 and the flood basin 16 with associated flood line 26 are shown in FIG. 1, it is ensured that the emergency final pressure in the containment 10 does not exceed a permissible threshold. This is achieved primarily by cooling and condensing the steam. In this context, an important role is played by the building condenser 32, by means of which heat can be dissipated from the containment 10 to the outside.

During an emergency, under certain circumstances non-condensable gases, such as for example hydrogen or inert gases such as air or nitrogen, will be released and accumulate in the upper region of the containment 10, i.e. in the upper region of the pressure chamber 18. The non-condensable gases collect in the upper region of the pressure chamber and lead to an increase in the pressure in the containment 10. When a certain pressure is reached in the pressure chamber 18, the steam together with the non-condensable gases, through the condensation tube 28, can overcome the pressure of the water column 30 in the condensation tube 28 and flow into the condensation chamber 24. The entrained steam is cooled and condensed in the condensation chamber 14, while the non-condensable gases remain in the condensation chamber 14.

In principle, the non-condensable gases impair the efficiency of the building condenser 32 by significantly reducing the heat transfer capacity of the building condenser 32. When non-condensable gases are present, the building condenser 32 can only dissipate significantly less heat per unit time and area from the steam to the cooling basin 34 than when the non-condensable gases are absent. Since these non-condensable gases are diverted out of the vicinity of the building condenser 32 by the condensation tube 28, the building condenser 32 can be designed for saturated steam. Therefore, it does not need large and specially designed heat transfer surfaces, which if non-condensable gases were present would be absolutely imperative in order to enable sufficient heat to be dissipated. Therefore, the building condenser 32 can be of simpler, more compact and therefore more advantageous design.

The structure and functioning of the condensation tube 28 which leads into the condensation chamber 14 in accordance with the present invention will now be described in more detail on the basis of the diagrammatic illustration present in FIG. 2.

In the event of an emergency, with the associated increased pressure in the pressure chamber 18, steam flows out of the pressure chamber 18, together with the non-condensable gases, through the condensation tube 28 and into the condensation chamber 14. As illustrated in the graph presented in FIG. 3B, in the process, in the case of a conventional condensation tube, i.e. a substantially vertically running condensation tube with a lower end which is cut off perpendicular to the tube axis, pressures of up to 2 bar on the base and walls of the condensation chamber 14 occur when the water is thrown up during the initial overflow of air, and pressures of up to 10 bar on the base and walls of the condensation chamber 14 occur during the phenomenon known as chugging, i.e. the formation of steam bubbles in the condensation chamber 14 toward the end of the overflow phase. To reduce these high pressure loads on the walls and base of the condensation chamber 14, the condensation chamber 28 of the containment 10 according to the invention is constructed as follows.

The condensation tube 28 has a substantially vertically running main section 28a, at the upper end of which there is provided an inlet opening 28b inside the pressure chamber 18. The lower end of the vertical section 28a of the condensation tube 28 is adjoined by an elbow 28c. The elbow 28c is substantially a curved tube section with an elbow angle 28e of preferably between approximately 70° and 85°, particularly preferably of approximately 82°. The condensation tube 28 projects, by means of this elbow 28c, into the cooling liquid, below the filling level of the cooling liquid 20 in the condensation chamber 14, with a slight downward inclination. An outlet nozzle 28d is provided at the lower end of the elbow 28c. In the exemplary embodiment shown, the outlet nozzle 28d is made from a straight piece of tube, the length of which on the side facing the base of the condensation chamber 14 is considerably longer than on the side remote from the base.

This particular design of the condensation tube 28 with the elbow 28c and the special outlet nozzle 28d means that in the event of an emergency the pressure loads on the base and walls of the condensation chamber 14 are likely to be significantly lower both during the initial throwing-up of water and during the subsequent chugging. This is also confirmed by tests, the results of which are illustrated in the graph presented in FIG. 3A. The pressure loads which occur are in a range below approximately 1 bar throughout the entire time, i.e. are significantly lower than the pressure loads of initially at most 2 bar and up to 10 bar toward the end in the case of the conventional condensation tube (cf. FIG. 3B).

Unlike conventional containments 10, the condensation tube 28 is also not held in the condensation chamber by means of suitable holding structures. Instead, a significant part of the condensation tube 28, in particular the vertically running main section 28a and a large part of the elbow 28c, is embedded in the concrete wall of the condensation chamber. As a result, the wall 38 of the condensation chamber 14 absorbs all the forces which occur in the condensation tube and offers additional protection against the possibility of a condensation tube 28 fracturing.

Overall, the invention provides a containment 10 of a nuclear power plant which has a condensation tube which significantly reduces the pressure loads on the base and walls of the condensation chamber compared to a conventional condensation tube. This increases the safety of the containment and reduces the demands imposed on the building structure of the containment.

Although the present invention has been described above on the basis of a preferred exemplary embodiment, it will be understood by those of skill in the pertinent art that various modifications to this embodiment can be performed while still remaining within the scope of protection of the present invention as defined by the appended claims. In particular, the design of the outlet nozzle is not limited to the form of a straight section of tube with long sides of different lengths described above. The only crucial factor in designing the outlet nozzle is the outlet effect of the media flowing through the condensation tubes which is brought about by the outlet nozzle. Furthermore, the condensation tubes comprising the vertical main section, the elbow and the outlet nozzle may be in both single-part form and composed of a plurality of separately manufactured components which are subsequently tightly connected to one another.

I claim:

1. A containment of a nuclear power plant, comprising:
    a containment structure having formed therein a pressure chamber and a condensation chamber with a base, said condensation chamber having a cooling liquid therein, the cooling liquid having a surface defining a horizontal;
    a vertical condensation tube having an upper end communicating with said pressure chamber and a lower end immersed in the cooling liquid in said condensation chamber;
    said lower end of said condensation tube being formed with an elbow leading into an outlet nozzle;
    said elbow having an elbow angle causing a lower end of said elbow to be immersed obliquely with respect to the horizontal; and said outlet nozzle of said condensation tube being formed by a tube section having a beveled end defining an outlet opening directed towards the surface defining the horizontal.

2. The containment according to claim 1, wherein said elbow angle of said elbow of said condensation tube is between 70° and 85°, whereby said lower end of said elbow is immersed in the cooling liquid in said condensation chamber with an oblique downward inclination.

3. The containment according to claim 2, wherein said elbow angle of said elbow is 82°.

4. The containment according to claim 1, wherein a portion of said condensation tube is embedded in a wall of said condensation chamber.

\* \* \* \* \*